Aug. 2, 1927.  1,637,465
E. W. BIERMAN
TUBULAR MOLDING APPARATUS
Filed July 14, 1925  3 Sheets-Sheet 1
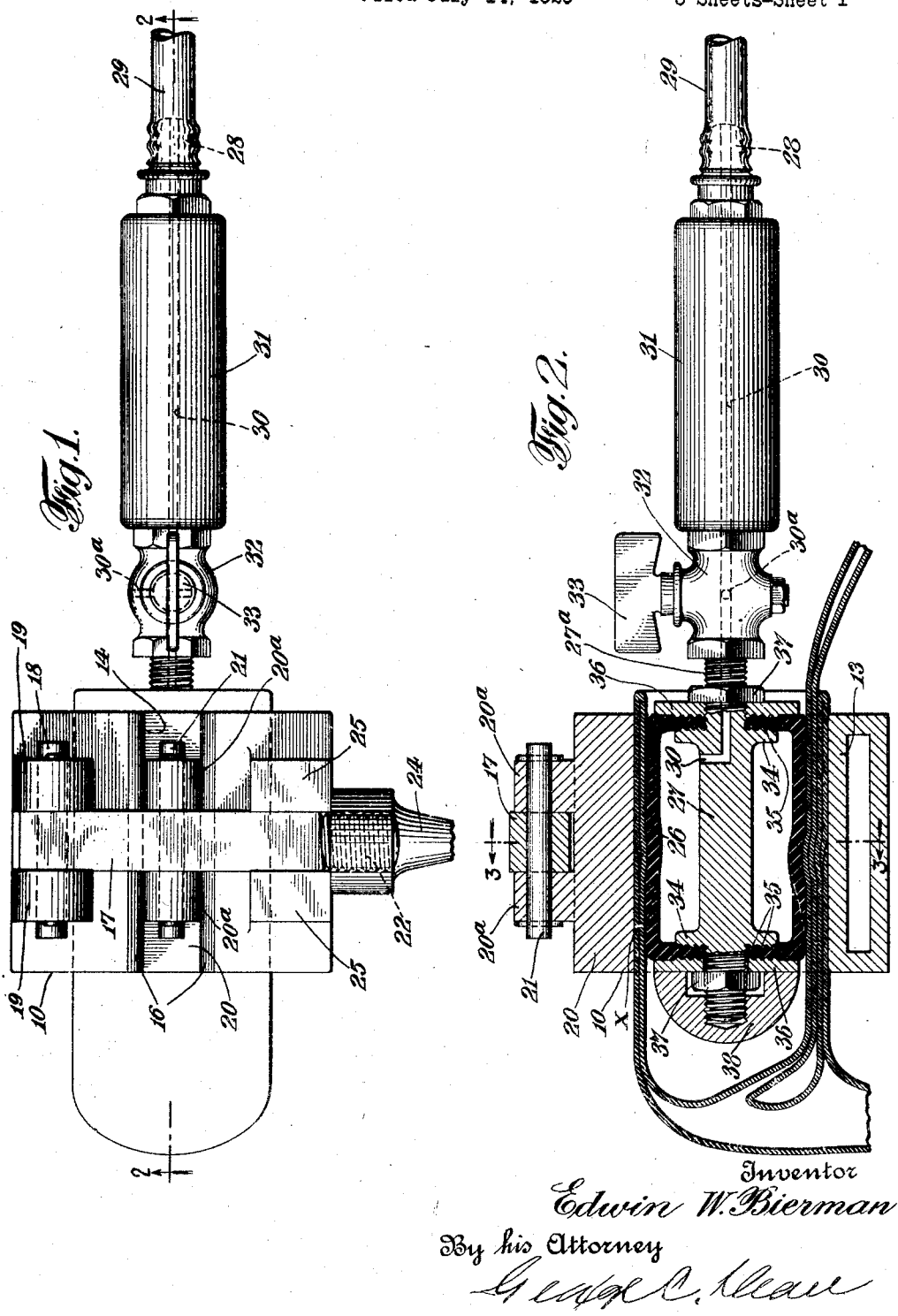
Inventor
Edwin W. Bierman
By his Attorney Aug. 2, 1927.  
E. W. BIERMAN  
1,637,465  
TUBULAR MOLDING APPARATUS  
Filed July 14, 1925  
3 Sheets-Sheet 2
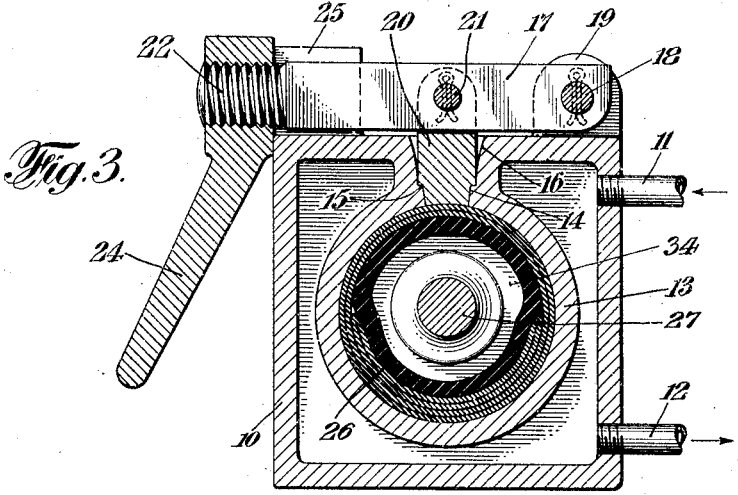
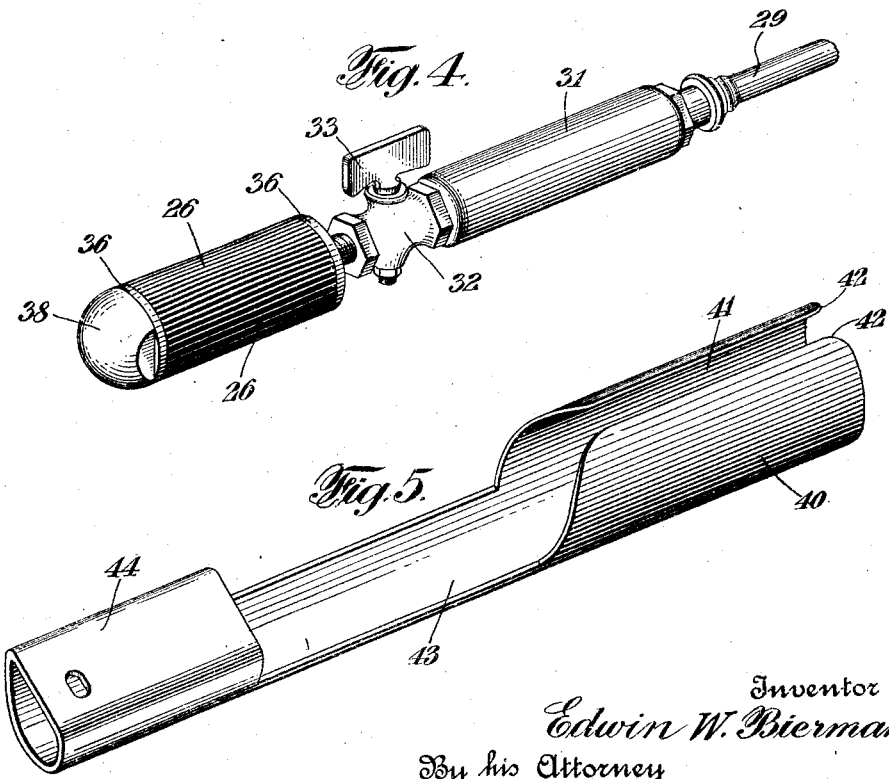
Inventor  
Edwin W. Bierman  
By his Attorney

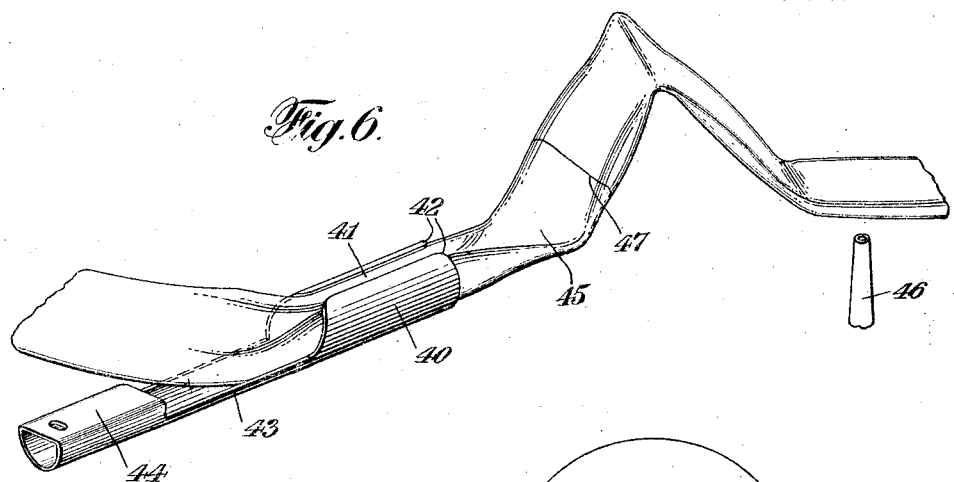
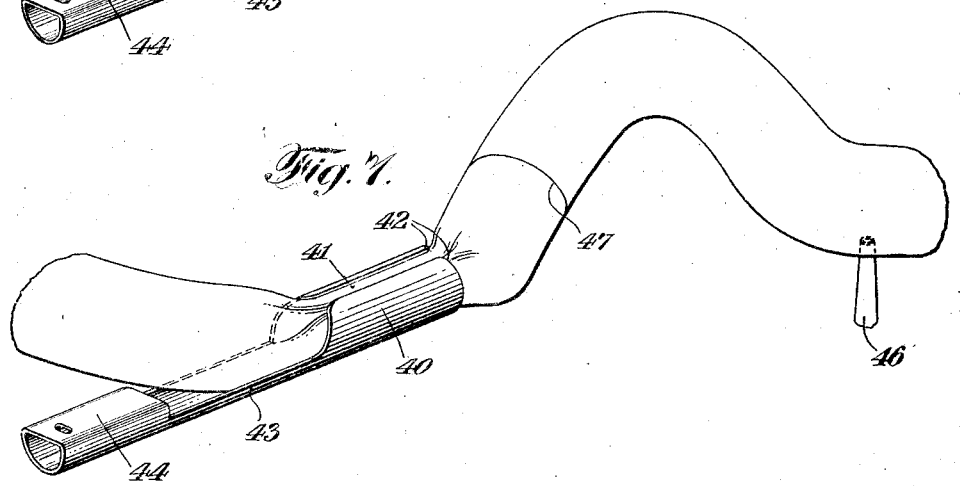
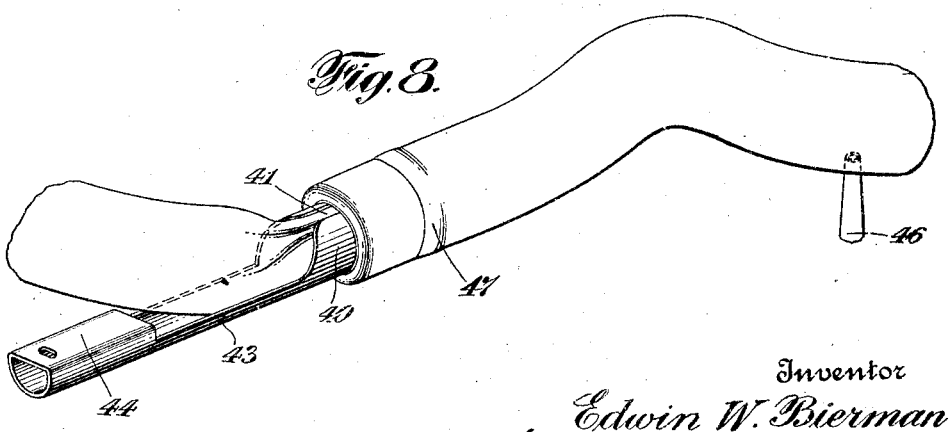

Patented Aug. 2, 1927.

1,637,465

UNITED STATES PATENT OFFICE.

EDWIN W. BIERMAN, OF KEOKUK, IOWA, ASSIGNOR TO STANDARD FOUR TIRE CO., OF KEOKUK, IOWA, A CORPORATION OF IOWA.

TUBULAR-MOLDING APPARATUS.

Application filed July 14, 1925. Serial No. 43,453.

My present invention relates to improved apparatus for vulcanizing tube splices and is particularly adapted for embodiment in a device for curing the splices of endless or annular tubes of rubber or the like, such as the inner tubes commonly used in automobile tires. It includes an improved method of folding or cuffing the endless tube prior to its introduction into the vulcanizing machine and also a novel type of cuffing mandrel upon which the tube folding is adapted to be performed.

A feature of the invention is the provision of a machine which includes a steam heated tube-enclosing mold that is substantially rigid, in combination with an elastic or non-positively operating expander which fits within the cuff of the tube and presses the splice outward into firm engagement with the inner surface of the mold.

Preferably the expander is in the nature of a flexible pneumatic tube or bag. The mold is steam jacketed throughout the major portion of its periphery and has a slot in one wall thereof through which the endless tube is entered, said slot being subsequently closed by a metallic key member, the inner end of which follows the curvature of the steam heated walls of the mold. This key becomes highly heated by conduction from the mold walls so that the entire annular splice is subjected to a substantially uniform temperature as well as a uniform pressure.

The method of folding or cuffing is extremely expeditious and simple, the tubes may be delivered to the mold in properly folded position and readily inserted thereinto with the annular splice in contact through its length with the mold walls.

The preferred method of cuffing includes inserting the deflated tube through a narrow slot in an approximately cylindrical mandrel, inflating the tube, folding the tube back over the mandrel to form a two-ply cuff, then deflating the tube and removing the same from the mandrel.

When the device is placed in the vulcanizing machine, the expander is run into the cuff and separated from the hot mold walls by two plies of tubing throughout a semicircumference and four plies of tubing throughout the other semi-circumference.

The invention may be more fully understood from the following description in connection with the accompanying drawings wherein:

Fig. 1 is a plan view of the apparatus;
Fig. 2 is a longitudinal section therethrough on the line 2—2 of Fig. 1;
Fig. 3 is a transverse section on the line 3—3 of Fig. 2;
Fig. 4 is a perspective view of the expander;
Fig. 5 is a perspective view of the cuffing mandrel; and
Figs. 6, 7 and 8 are perspective views illustrating successive steps in the operation of cuffing the tube.

In these drawings the vulcanizing mold is shown as comprising a steam chest 10 provided with inlet pipe 11 and outlet pipe 12, having a cylindrical inner wall 13 which forms the hot mold surface against which the tube splice is adapted to be held. The tube is entered into the mold through a slot 14 in the top thereof. This slot is shouldered as at 15 and tapered at 16 near its outer end.

A lever 17 pivoted on a pin 18 connecting a pair of ears 19 rising from the top of the mold carries at its intermediate portion a key or filler 20 for closing the slot 14, this key including ears 20ª pivoted on a pin 21 carried by the lever. The key is shaped to fit the shouldered slot and the tapered walls 15 readily guide the key into place as the lever is swung in position of Fig. 3. The shoulder acts as a gauge element to precisely position the key with its segmental tube engaging surface in exact registry with the corresponding cylindrical inner face of the mold. Such gauge element is particularly desirable because the opposite faces of the key converge at a sharp angle, which would afford a powerful wedging effect tending to spring the mold and widen the slot. Tapering off the slot 14 so that it is much wider at the top than is the key, affords sufficient clearance so that when combined with the further feature of pivoting the key to the lever, the lever and key can be swung to and from closed position without danger of the key becoming cocked or jammed in the slot. The key is thin enough to be easily heated to the required temperature by conduction from the steam heated mold, but may be hollow and itself heated, if desired.

The free end of the lever is threaded at 22 to accommodate locking nut provided with a handle 24, whereby the nut may be rotated into clamping engagement with blocks 25 rising from the top of the steam chest to lock the lever and thereby the key, in the closed position. It will be noted that the clamping stress is tangential to the cylinder and has a direct tendency to spring the mold into lateral clamping engagement with the wedge surfaces of the key, with the result that the key is held by friction, as well as by the lever, when the locking nut is screwed tight.

Cooperating with the mold to clamp a tube, is an expanding device including an air bag 26, preferably of heavy rubber with square moulded ends, afforded by two cup members, one forming the entire mandrel surface and the other being coned and vulcanized therein as shown at $x$, Fig. 2. This is mounted on the end of a longitudinally extending tubular member having a handle 31 and formed at one end with a nipple 28 to which an air hose 29 is coupled and it has the air passage 30 extending from the nipple to the other end which connects with the stem $27^a$ that carries the air bag 26. The sections 27 and $27^a$ are connected by coupling member 32 in which I mount a manually operable valve 33 for controlling the air passage 30. Preferably this is a three port valve adapted to relieve pressure through vent $30^a$ when turned to cut off the air supply.

The section of the stem which carries the air bag is formed with a pair of spaced oppositely facing external flanges 34, the faces of which are ribbed as at 35 and coact with similarly ribbed flanges 36 to clamp the ends of the air bag. Lock nuts 37 around the threaded stem 27 retain the clamping nuts 36 in place and if desired, the end of the stem may receive a threaded boss or nut 38 having a smooth outer surface to protect the soft rubber of the tube and splice from contact with the corners of clamping nut 37 and the thread on which the latter screws.

A feature of the invention is the improved method and apparatus for properly cuffing the tube prior to its insertion into the mold and prior to the insertion of the expander within the tube.

The cuffing mandrel is shown in perspective in Fig. 5 wherein it will be noted that it includes a substantially cylindrical end 40 constituting a folding guide and narrow longitudinally extending slot 41 therein, the end corners of which are curved as at 42 to prevent catching or tearing the tubes. A shank 43 forms an extension of one side of the cylindrical end 40 and terminates in a handle member 44 of approximately semicircular cross section. As seen in Fig. 6, the slot 41 permits a deflated tube 45 to be readily inserted within the cylindrical folding guide 40. After the tube has been inserted, it is inflated as in Fig. 7 through the usual air valve 46. This inflation makes the folding or cuffing operation very easy and the tube is folded back over the outside of the folding guide 40 in such a manner that the splice 47 therein is disposed on the outside of the double ply cuff. The tube is then deflated and the mandrel slipped out.

The properly cuffed tube is inserted through the slot 14 into the mold.

The lever 17 is then closed, swinging the key into operative position to close the mold. The handle 24 is rotated to lock the lever. The expanding air bag is then inserted into the cuffed tube as seen most clearly in Fig. 2.

After the expander has been inserted within the tube, the valve is turned to admit compressed air and any desired degree of pressure may be obtained to elastically clamp the splice or weld against the heated walls of the mold. When the valve 33 is turned to cut off supply through 30 and relieve the pressure through $30^a$, the expander may be readily withdrawn, the handle 24 rotated, the lever swung upward to remove the key and the tube withdrawn through the slot 14.

It will be noted that throughout a semicircumference of the mold there is only one thickness of rubber between the splice and the air bag, while there are three plies of rubber between the bag and the splice throughout the other semi-circumference of the cuff tube. This will be immaterial, however, so far as exerting proper pressure on the splice is concerned because the cylindrical portion of the expander is of heavy highly resilient rubber with fabric reenforced ends. Hence the pressure exerted at the surface of the mold 13 by the cylindrical portion is substantially the same whether exerted through two or four thicknesses of the rubber tubing. It is a fact, however, that considerably more heat from the mold 13 reaches the rubber mandrel 26 through the two plies than through the four plies. In course of time this heat tends to cause devulcanization of the rubber so that if the valve is placed always in the upright position shown in the drawings, the upper side being always exposed to the greater heat coming through the two plies of the tube, will devulcanize much the faster and the mandrel bag will become warped. Hence, when assembling, the valve side should be turned downward as often as upward and in many cases I find it desirable to eliminate the valve at this point and locate it back in the line leading to the hose 29. Then the operator will have no incentive to insert the mandrel one side up and naturally it will average out that all sides are used uppermost approximately the same number of times and whatever devulcanizing will be symmetrical and will not warp the bag out of shape.

I claim:

1. Apparatus for vulcanizing rubber tube splices, including a hollow steam heated mold formed with a rigid cylindrical inner wall and having a narrow, longitudinally extending key segment that is radially removable to afford a longitudinal slot through which a cuffed endless tube may be inserted for contact of the splice with the cylindrical inner walls of said mold and key, in combination with a loose pivotal mounting for the key upon the mold for swinging the key into and out of the slot in parallelism therewith, the outer part of said slot being substantially wider than the key, the inner slot engaging surfaces of the key being approximately the same size and taper as the slot, and the outer part of the slot being substantially wider than the key to afford clearance for such swinging movement of the key, and said parts being formed with cooperating gauge elements operating as stop to position the inner, tube-engaging surface of the key flush with the corresponding inner surface of the mold.

2. Apparatus for vulcanizing rubber tube splices, including a hollow steam heated mold formed with a rigid cylindrical inner wall and having a narrow, longitudinally extending key segment that is radially removable to afford a longitudinal slot through which a cuffed endless tube may be inserted for contact of the splice with the cylindrical inner walls of said mold and key, in combination with a loose pivotal mounting for the key upon the mold for swinging the key into and out of the slot in parallelism therewith, the outer part of said slot being substantially wider than the key, the inner slot engaging surfaces of the key being approximately the same size and taper as the slot and the outer part of the slot being substantially wider than the key to afford clearance for such swinging movement of the key.

3. Apparatus of the class described, including a hollow steam heated mold formed with a rigid cylindrical inner wall and having a norraw longitudinal segment that is removable to afford an opening through which endless tubes are adapted to be inserted into the mold and a swinging lever carrying the removable segment, loosely pivoted thereon.

4. Apparatus of the class described, including a hollow steam heated mold formed with a rigid cylindrical inner wall and having a narrow longitudinal segment that is removable to afford an opening through which endless tubes are adapted to be inserted into the mold and a swinging lever carrying the removable segment loosely pivoted thereon and means for locking the lever to clamp said segment in place.

5. An expanding mandrel of the class described including a shank formed with integral external oppositely facing flanges at right angles therewith, nuts cooperating with the flanges to clamp the end of a cylindrical air bag, said shank having an air passage therein for delivering fluid under pressure within the bag and said bag having approximately plane ends molded integral with the cylindrical walls.

6. An expanding mandrel of the class described including a shank formed with external oppositely facing flanges, nuts cooperating with the flanges to clamp the end of a cylindrical air bag, said shank having an air passage therein for delivering fluid under pressure within the bag and said bag having approximately plane ends molded integral with the cylindrical walls and the whole being formed by two cups having their edges overlapped and spliced.

7. An expanding mandrel of the class described including a shank formed with integral external oppositely facing flanges at right angles therewith, nuts cooperating with the flanges to clamp the end of a cylindrical air bag, said flanges and nuts including cooperating ribbed gripping surfaces at right angles to the shank, between which the bag ends are clamped.

8. An expanding mandrel of the class described including a shank formed with integral external oppositely facing flanges at right angles therewith, nuts cooperating with the flanges to clamp the end of a cylindrical air bag, said flanges and nuts including cooperating ribbed gripping surfaces at right angles to the shank, between which the bag ends are clamped, a manually operable valve controlling the air passage.

Signed at Keokuk in the county of Lee, and State of Iowa this 9th day of July, A. D. 1925.

EDWIN W. BIERMAN.